US011843679B2

(12) United States Patent
Franczyk et al.

(10) Patent No.: US 11,843,679 B2
(45) Date of Patent: Dec. 12, 2023

(54) AUTOMATED DEPENDENCY MANAGEMENT BASED ON PAGE COMPONENTS

(71) Applicant: WP Company LLC, Washington, DC (US)

(72) Inventors: Gregory Franczyk, Brooklyn, NY (US); Timothy Kim, Falls Church, VA (US); Lucas David Mason, Alexandria, VA (US)

(73) Assignee: WP Company LLC, Washington, DC (US)

( * ) Notice: Subject to any disclaimer, the term of this patent is extended or adjusted under 35 U.S.C. 154(b) by 0 days.

(21) Appl. No.: 15/221,291

(22) Filed: Jul. 27, 2016

(65) Prior Publication Data

US 2017/0031884 A1    Feb. 2, 2017

Related U.S. Application Data

(60) Provisional application No. 62/197,402, filed on Jul. 27, 2015.

(51) Int. Cl.
| | |
|---|---|
| *G06F 40/154* | (2020.01) |
| *G06F 40/143* | (2020.01) |
| *G06F 40/186* | (2020.01) |
| *H04L 67/02* | (2022.01) |
| *H04L 67/567* | (2022.01) |
| *G06F 16/957* | (2019.01) |

(52) U.S. Cl.
CPC ........ *H04L 67/567* (2022.05); *G06F 16/9574* (2019.01); *G06F 40/143* (2020.01); *G06F 40/154* (2020.01); *H04L 67/02* (2013.01); *G06F 40/186* (2020.01)

(58) Field of Classification Search
CPC ........... G06F 17/30873; G06F 17/2247; G06F 17/30905; G06F 17/30902; G06F 17/30864; G06F 17/3089; G06F 17/30899; G06F 17/30893; G06F 16/95; G06F 16/9574; G06F 40/143; G06F 40/154; G06F 40/186; H04L 67/567; H04L 67/02
See application file for complete search history.

(56) References Cited

U.S. PATENT DOCUMENTS 7,822,741 B2   10/2010  Sonkin et al.
8,285,808 B1 *  10/2012  Joel ................. G06F 17/30905
                                              345/473

(Continued)

*Primary Examiner* — Cesar B Paula
*Assistant Examiner* — Carl E Barnes, Jr.
(74) *Attorney, Agent, or Firm* — Nixon & Vanderhye, PC (57) ABSTRACT

Techniques to provide for reducing the time for rendering a web page by efficiently and optimally aggregating various resources transmitted to the browser during the page load (e.g., loading of the web page). Some example implementations include, upon receipt of a request for a web page, identifying a plurality of page features for displaying the web page, where each of the page features being associated with a respective manifest of dependencies on resources. Example implementations may also include aggregating dependencies of said plurality of page features to generate an optimized set of dependencies for the web page, resolving dependencies in accordance with the optimized set of dependencies, and render the web page by rendering the plurality of page features using the resolved dependencies.

16 Claims, 4 Drawing Sheets

(56) References Cited

U.S. PATENT DOCUMENTS

| | | | | |
|---|---|---|---|---|
| 2007/0038643 | A1* | 2/2007 | Epstein | G06F 17/30876 |
| 2007/0192683 | A1* | 8/2007 | Bodin | G06F 17/30905 |
| | | | | 715/234 |
| 2009/0031210 | A1* | 1/2009 | Backhouse | G06F 17/3089 |
| | | | | 715/234 |
| 2009/0248883 | A1* | 10/2009 | Suryanarayana | G06F 9/451 |
| | | | | 709/229 |
| 2009/0276488 | A1* | 11/2009 | Alstad | H04L 67/5651 |
| | | | | 709/206 |
| 2013/0226992 | A1* | 8/2013 | Bapst | H04L 67/42 |
| | | | | 709/203 |
| 2013/0227078 | A1* | 8/2013 | Wei | H04L 67/2814 |
| | | | | 709/219 |
| 2014/0229818 | A1* | 8/2014 | Goswami | G06F 17/2247 |
| | | | | 715/234 |
| 2016/0103803 | A1* | 4/2016 | Lam | G06F 17/30902 |
| | | | | 715/234 |

\* cited by examiner

AUTOMATED DEPENDENCY MANAGEMENT BASED ON PAGE COMPONENTS

CROSS-REFERENCE TO RELATED APPLICATIONS

This application claims the benefit of U.S. Provisional Patent Application No. 62/197,402 filed on Jul. 27, 2015, which is hereby incorporated by reference in its entirety.

FIELD

The subject matter below relates to rendering of web-accessible content.

BACKGROUND

Page rendering engines for creating browsable web pages are known. These engines enable users to relatively quickly create a web page including content. In particular, after the content is obtained and its arrangement on the web page is decided, the page rendering engine may do all, or a substantial part, of the rendering without the user having to write programming code for that purpose. Page Builder™ by Site Origin™ is a plugin that provides some rendering capabilities on the WordPress platform. These conventional page rendering techniques may be used by organizations, such as, for example, media services organizations, to distribute their product (e.g., content) via the web.

However, as many media services move to delivering their products via the web, and as the sources for content continue to evolve, improved page rendering engines that are even more capable of efficiently leveraging available resources are desired.

SUMMARY

The embodiments herein provide for reducing the time for rendering a web page by efficiently and optimally aggregating various resources transmitted to the browser during the page load (e.g., loading of the web page). Embodiments may be used, for example, by a newspaper operation to build web pages comprising many page features on its website. Embodiments improve the agility of the development organization by automating the management of page dependencies.

The page rendering system, according to embodiments, enables clients (e.g., web page developers/editors) to create web pages and templates through a web admin interface by selecting, positioning, and configuring a set of page features (i.e., atomic elements on web pages, also referred to as modules). Moreover, the page rendering system according to embodiments may also be responsible for performing all, or substantially all, of the work to build the rendered response (e.g., the requested web page) to requesting end users (e.g., readers/visitors of the web site).

DETAILED DESCRIPTION

Figure 1:
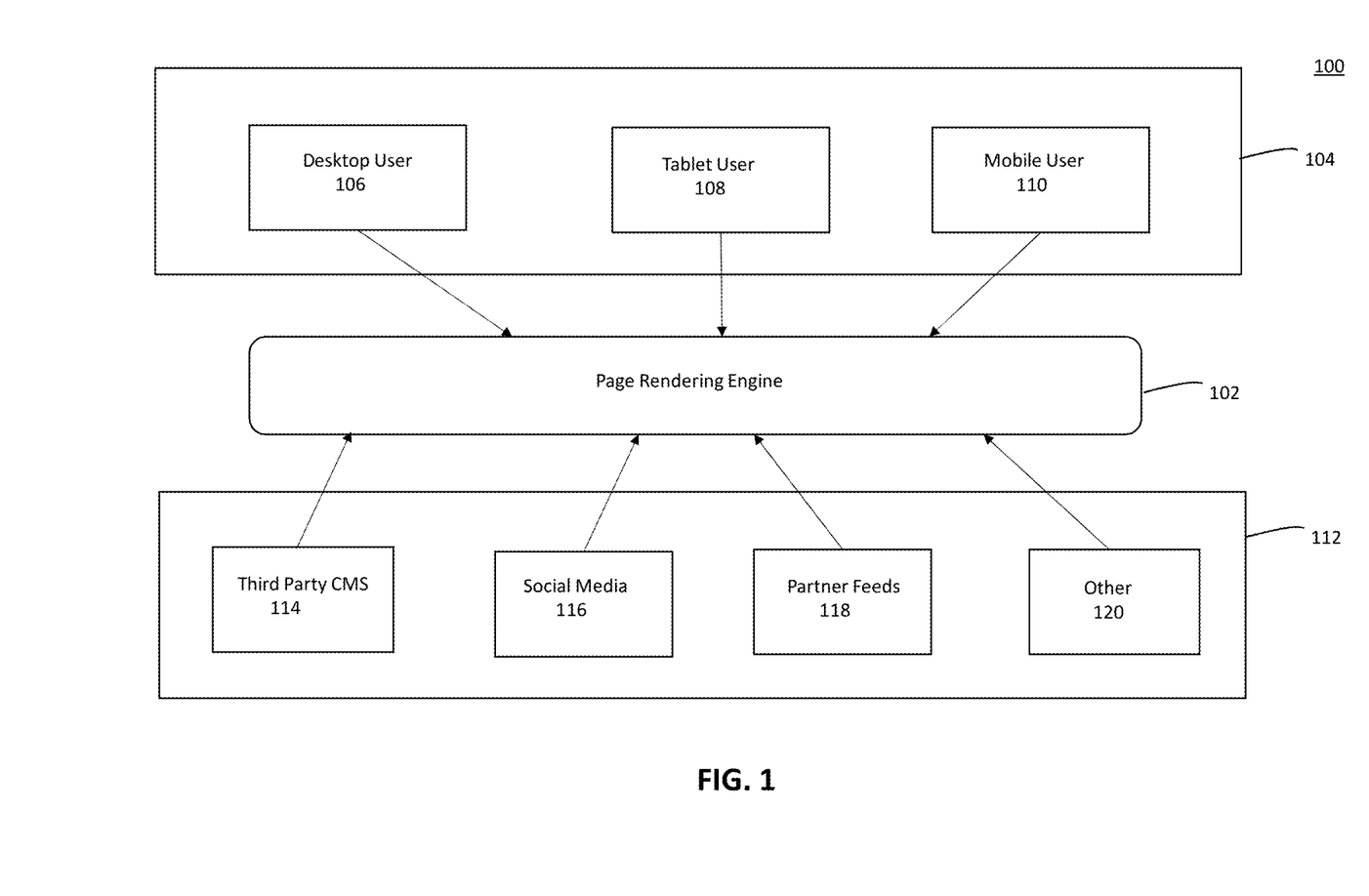
FIG. 1 is a high-level schematic of a system including a page rendering engine according to some embodiments.

The basic architecture of the page rendering system 100 according to one or more exemplary embodiments is schematically illustrated in FIG. 1. A page rendering engine 102 operates to render web pages on a plurality of types of web-accessing devices 104 being used by one or more end users. A desktop computer 106, a tablet 108, and a mobile device 110 are shown in FIG. 1 as example web-accessing devices used by end users. It will be understood, however, that page rendering engine 102 is not limited to rendering pages in a browser. For example, some embodiments can produce any text based rendering that's available through digital channels, including, e-mail's, RSS feeds, and other programmatic formats that can be used by downstream applications such as, for example, mobile and tablet native apps. The page rendering engine 102 operates to obtain information, including content that is subsequently rendered on the web-accessing devices 104, from various content providers 112. Content providers 112 may include web authoring platforms such as WordPress™ 114, social media platforms (e.g. Twitter™, Facebook™, Google+™ etc.) 116, partner feeds (e.g., news organization feeds, stock market feeds, etc.) 118, and other content providers 120 such as, for example, arbitrary databases (Washington Post's recipe database, election results etc.), quiz and poll platforms, digital asset management systems (such as, for example, video and photo content management systems). Thus, as illustrated in FIG. 1, the page rendering engine 102, takes as input, content from various content providers 112, and subsequently renders web-accessible pages, which include the content obtained as input, on various devices 104 for end users of the web site.

Web pages rendered by the page rendering system 100 are made up of "page features" which are modular components, like, for example, the navigation bar, header (e.g., page header, section header, etc.), a piece of content (e.g., an article body, an article header, an article, a video clip, etc.), or widget (e.g., a clickable icon for downloading an identified content, a social media share button, etc.). A web page includes page features arranged in a particular manner. Rendering a web page includes, determining an arrangement of plural features in a desired manner, and then writing the various page features according to the arrangement and with corresponding content to the device of an end user. The rendering may proceed by first rendering each page feature individually, and then rendering the page containing all the page features. When the page rendering system 100 is deployed at a media services organization, page features are typically built by developers at the media services organization, and are added to web pages through the web administrative interface (web admin interface). When a page feature is added to a web page, it is referred to as an "instance of a page feature." An instance of a page feature includes the page feature, as built by the developer, and the configuration and/or content that has been associated with the page feature through the web admin interface.

Each page feature can be logically connected to a piece of data in a content management system (CMS) or in another source. When a developer is building a page feature, the developer can specify at least one type of content to use in the page feature. The system may be configured such that one or more base types are included for each page feature by default. For example, a page feature can specify that it is configured to handle one or more particular types of content (e.g., gallery, a link to social media etc.). Subsequently, page features are matched, based on their specified handling capabilities, with content that require such capabilities. In some embodiments, the developer can define custom types, in place or in addition to any types provided by default. According to an embodiment, an extension module can be used for defining such custom types. When a default type is used, the page rendering engine will already know, based on some predetermined configuration, how to retrieve it. When a custom type is used, the developer who builds the custom type should also build, or specify to the system how to obtain, the logic to fetch the custom type. U.S. application Ser. No. 15/221,28, filed on Jul. 27, 2016, and titled "Native Integration of Arbitrary Data Sources", which is herein incorporated by reference in its entirety, describes techniques that may be used in example embodiments for accessing data sources.

In another exemplary embodiment, a newspaper organization (e.g., a media services organization such as the Washington Post) may use a page rendering engine, such as page rendering engine 102, as its single, unified, rendering solution for its online website(s). Everything that's added to the site (or sites), whether it's a recipes microsite, articles, or the homepage, are built as a set of page features, and the page rendering engine performs the operations implementing the functionality to bring the various contents and other aspects together so that the web-page as seen by the end users of the web site(s) is rendered.

As described above, each web page is formed by a plurality of page features. These page features comprise the various page elements a site visitor reads and interacts with while on the page including text, images, media, and any interactive media. Each page feature contributes the Hypertext Markup Language (HTML) necessary for the feature to display itself on the page. Page features are modular components, like, for example, the navigation bar, header (e.g., page header, section header, etc.), a piece of content (e.g., an article body, an article header, an article, a video clip, etc.), or widget (e.g., a clickable icon for downloading an identified content, a social media share button, etc.). A web page includes page features arranged in a particular manner. A page feature comprises a content type and one or more attributes associated with rendering content of the content type. In some embodiments, a page feature may contain multiple content types (e.g., a gallery, a headline and text). In yet other embodiments, a page feature may include multiple other page features each of which comprises a content type.

The displaying of a web page by a browser involves individually rendering each of the page features, and thus may cause the exchange of many messages between the browser and the server. Because each of the page features have their dependencies, and these dependencies have to be resolved before the feature completed rendering, the rendering of pages with multiple page features arranged on the page in conventional systems may often result in poor response times for the user. For example, when a browser is loading a web page in a conventional system, the typical JavaScript loader loads multiple JavaScript, but blocks HTML page loading while multiple JavaScript scripts are loading. Consider, for example, an article page on an online media site that might include ten separate JavaScript scripts to power interactivity and other page elements like online advertising. The page fully renders only after the tenth JavaScript script completes loading. While some JavaScript loaders may have the capability to minify multiple JavaScript scripts, the loader still blocks page loading. This pause in page loading has a negative impact on user experience as current online media consumer might be reading content across devices and connectivity methods whether 3G/4G, Wi-Fi or home broadband.

In contrast to the JavaScript loading exercise in conventional systems described above, a page rendering engine according to embodiments takes a more module-based approach. When an article residing on an online media site which runs a page rendering engine according to embodiments loads ten JavaScript scripts, there is no interference to page loading time regardless of the site visitor's device or connectivity method, because, for example, the ten scripts are combined by the page rendering engine into a single optimized script.

The page rendering engine according to embodiments uses "page feature bundles" to enable a developer to include any dependencies including templates, scripts, manifest, styles, or external files directly with the page feature. The page rendering engine treats each page feature as a building block, and each page feature is independent of other page features. The scripts (e.g. JavaScript) on a page, according to embodiments, map to the particular page feature module separate from the HTML page structure. No conventional JavaScript loader supports this module-based approach as performed by the embodiments. Using a module-based technique for page rendering, as provided in the embodiments may improve response times and may also facilitate server-side development.

Dependency management and injection techniques are not new. However, the inventors believe that the approach, used in embodiments, of automatically managing dependencies through the development of page feature bundles that are used to render the base page is a novel approach to the problem. Rather than including resources at the page level, or attached to arbitrary pieces of the page markup, this technique uses page feature bundles to render web pages with the ability to declare dependencies in its manifest. Embodiments enable users to focus on page features (also referred to as page feature modules or page components), and simply declare the dependencies in the page feature bundle manifest. The page rendering engine will handle all dependency management based at least in part on the page feature bundle manifest.

The manifest is a configuration object, which defines how the page feature should operate, what other resources it depends on (like JavaScript libraries etc.), what fields are configurable in the admin, etc.

A web page can have any array of page feature instances—for example, the web page could have 10 instances of the same page feature on it, 10 instances of distinct page features, and anything in between. Although the types and quantity of page features on any page are tied to the page, the setup/configuration of the dependencies is specified only through the page features. As a result of the technique the page rendering engine according to embodiments automatically projects those dependencies onto the page that is being rendered. For example, in conventional development, one would be required to ensure the page has all the dependencies that individual elements on the page need. In conventional modular development, the modules bring in what they need even if that means two modules on the same page bring in the same library (e.g., twice).

Example embodiments bridge the gap by automatically and intelligently merging the requirements that the individual modules have at the page level, requiring no effort on the part of the web page developer as to what the page, as a whole, may need; while also ensuring dependencies are optimized as if they were considered from the perspective of the whole page.

As a page rendering engine implemented according to embodiments renders a web page, it automatically gathers all modular dependencies (e.g., all page feature dependencies) and creates a unified set of normalized, page-specific, dependencies. In some embodiments, these aggregated dependencies include any and all resources required for page composition including, for example, JavaScript, CSS, images, rich media, and/or any other resource that can be handled by the client platform.

Figure 2:
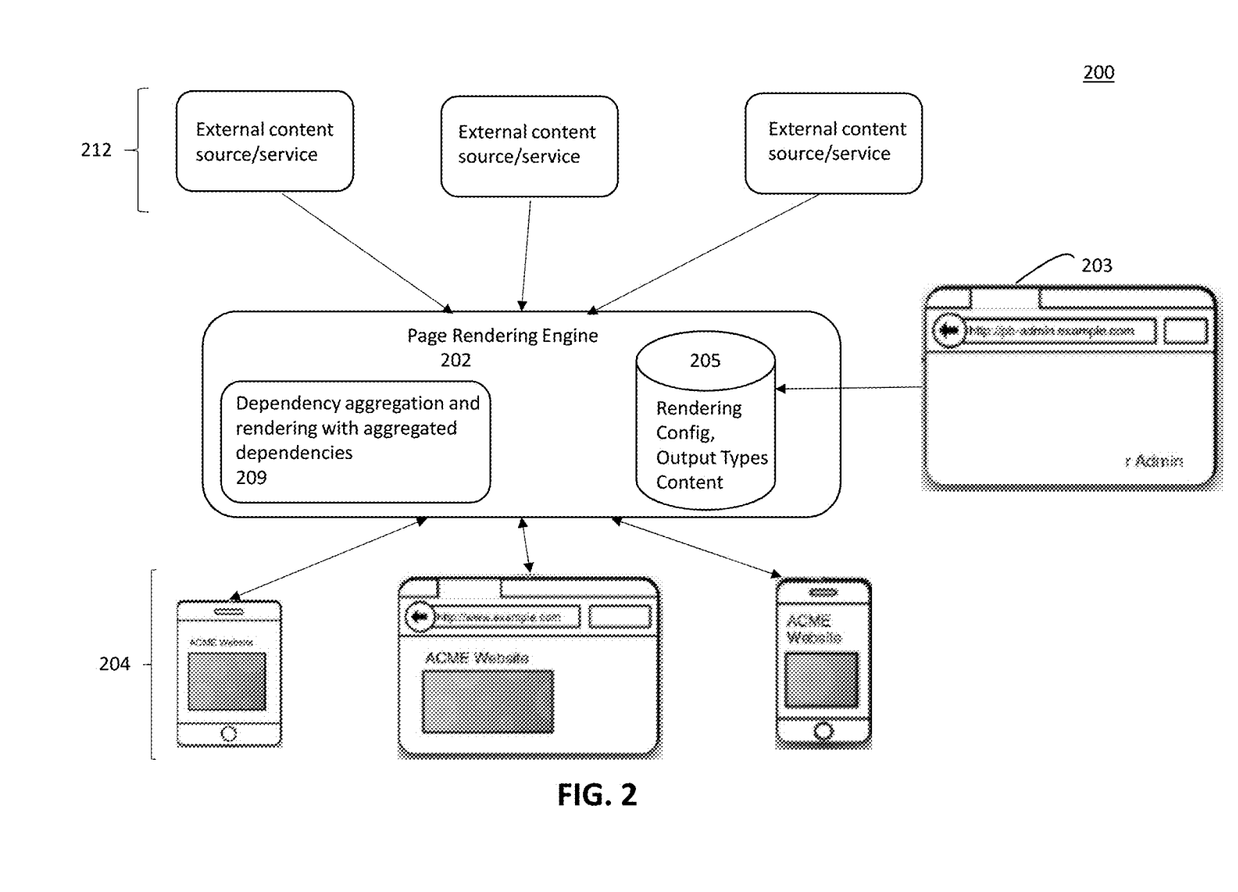
FIG. 2 illustrates some dependency aggregation functions provided by the page rendering engine according to some embodiments.

FIG. 2 is a further schematic illustration of the architecture of a page rendering system, according to some embodiments. Page rendering system 200 includes page rendering engine 202, web admin interface 203, interfaces to external services 212 and interfaces to access devices 204.

As illustrated in FIG. 2, the page rendering engine 202 may use JSON to integrate data from any number of external services 212 for rendering across any combination of web browsers, mobile devices 204, or other render targets. External services 212 in FIG. 2 represent external content sources including web services, rich media, and textual content from which the page rendering system 200 renders, using, for example, HTTP, content for user consumption across devices 204. The interaction and/or control of the page rendering engine 202 using the web admin 203 may be provided using configured and/or configurable information such as, for example, rendering feature configurations, output type configurations and/or content configurations. For example, an editorial user may place a page feature onto a page, that feature will include a variety of options that have been configured by the developer. The editorial user can use a web form to modify the rendering options, and when the feature instance is being rendered those option values will be considered and result in an appropriate rendering. For example, if a feature requires an additional library or resource for its specified operation, the feature may dynamically—above and beyond what is already specified in the manifest—declare a dependency, and, unlike in conventional systems, the page rendering engine can make the dependency available during page rendering.

Dependency management, as achieved for example by process 300 described below, may be provided by a component 209 which includes functionality to aggregate dependencies and render the visitor requested web page with the aggregated dependencies. The integration of external sources 212 to the page rendering engine 202 may be provided by a content service platform (not separately shown). The interaction with the access devices 204 may be controlled by a resolver (not separately shown). U.S. Provisional Application No. 62/197,355 titled "Native Integration of Arbitrary Content" and filed on Jul. 27, 2015, the contents of which is hereby incorporated by reference, describes the content service platform and the resolver of the page rendering engine 202.

Figure 3:
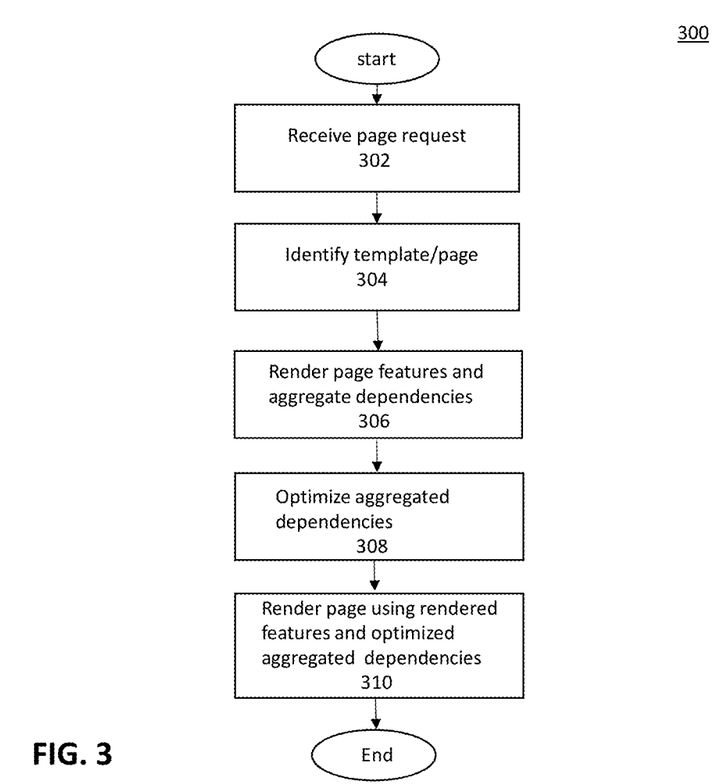
FIG. 3 illustrates a flowchart of a method of rendering a web page using aggregated dependencies, according to some embodiments.
Figure 4:
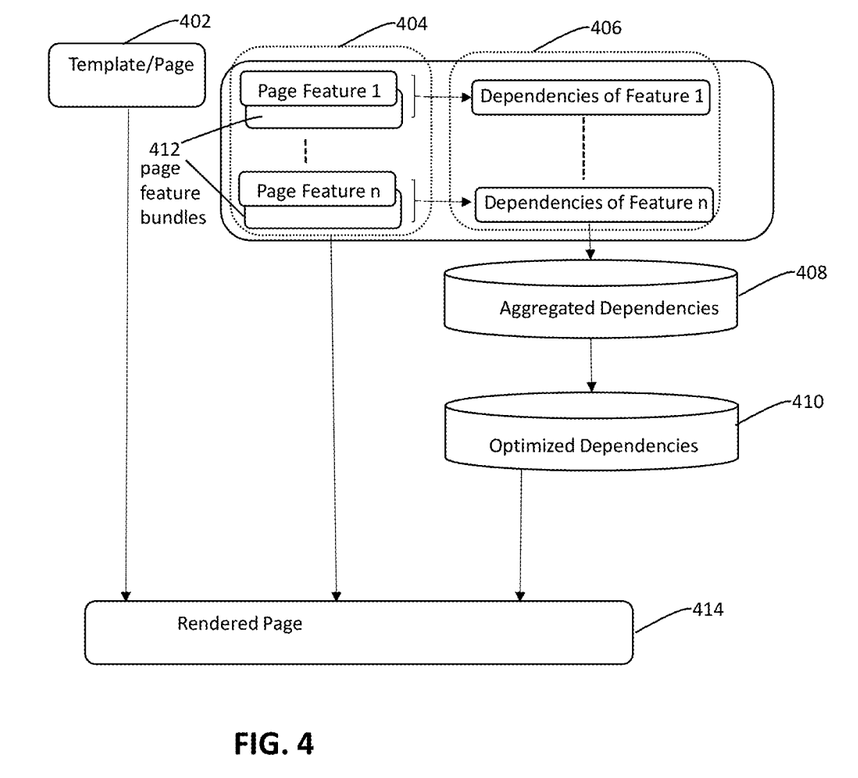
FIG. 4 illustrates a flowchart of aspects of page rendering with dependency aggregation, according to some embodiments.

FIG. 3 is a flow diagram of a process 300 for rendering a web page by a page rendering engine according to some embodiments, such as page rendering engines 102 and 202. A person skilled in the art would understand that operations 304-310 of process 300 may be executed sequentially, and/or that some operations 304-310 may be executed in parallel, in causing a web page to be rendered. In addition, process 300 may be executed on one or more processors of one or more computers. FIG. 4 illustrates some of the artifacts created during the execution of process 300, and the interaction among those artifacts.

Process 300 is entered when, at operation 302, a request is received to render a web page. For example, an end user using an access device such as a tablet computer attempts to access an article listed on the homepage of a news web site. At operation 302, a request for rendering a web page is received at the page rendering engine. The request specifies at least the web page desired by the end user. This information to be included in the request can be identified by the end user device when, for example, the user clicks on (i.e. selects) a link to particular page feature that is arranged on a rendered web page. Any value or combination of values included in the request (e.g., such as the User-Agent or other HTTP Request values as identified, for example, in http://www.w3.org/Protocols/rfc2616/rfc2616-sec5.html) may be used by the page rendering engine 202 in subsequent processing.

At operation 304, the web page (or template) to be served to the end user is identified. For example, the URL specified with the request may identify the web page, such as, template/page 402 shown in FIG. 4. The identified page 402 may be stored, for example, in database 205.

As noted above, typically a web page includes multiple page features. As described above, each of the page features is rendered separately. At operation 306, therefore, each of the page features that make up the requested web page is rendered.

Rendering page features includes, for each page feature, determining all its dependencies. Thus, as shown in FIG. 4, for each page feature 404 the corresponding set of dependencies 406 is determined. The dependencies are determined based upon the respective page feature bundle 412 associated with each page feature. The dependencies may include any and all resources required for page feature composition including JavaScript, CSS, images, and rich media. Additionally, operation 306 also includes aggregating the dependencies individually determined for each page feature. The aggregation may involve collecting all the dependencies for all the features. In some embodiments, aggregation performed at operation 306 may include filtering out of certain selected types of dependencies. For example, where a developer decides that it is somehow advantageous to exclude one or more resources (e.g., when the web editor determines that an already available resource for commenting should be disabled for a sensitive article) from aggregation and optimization in accordance with some embodiments described here, the developer can do this by directly referencing the one or more resources from the page feature code or by simply placing the script/styles directly inline. The aggregated dependencies, as represented by aggregated dependencies 408 derived based upon all page dependencies 406, may be stored in a memory or a persistent memory. These aggregated dependencies may represent a unified set of normalized, page-specific, dependencies for the requested web page.

At operation 308, the aggregated dependencies are processed in order to determine an optimal set of dependencies 410. The processing may include consolidation, compaction (e.g., eliminate white space and tightly pack code), minification (e.g., remove unnecessary characters and symbols—for example, in un-minified code, a variable might be called 'foo', after minification all references of that variable would be replaced to a leaner name, like 'f'; minification can be distinguished from the more general concept of data compression in that the minified source can be interpreted immediately without the need for an uncompression step: the same interpreter can work with both the original as well as with the minified source), and/or deduplication.

The page rendering engine according to embodiments may render all of the page features on a page and may copy their associated scripts and styles (e.g., resources corresponding to the dependencies of the page features) into in-memory buffers. When the page is rendered all of the scripts and styles are available in a small set of page level files. For example, instead of making reference from the page to 10 different files that originally held the scripts for 10 different page feature instances of a page, the page rendering engine according to embodiments consolidates all of these scripts into a single file.

Deduplication refers to both internally packaged scripts and externally referenced dependencies. With respect to internally packaged scripts, like those referred to above in relation to the consolidation (e.g. aggregation), when the page rendering engine goes through multiple feature instances, it will only bring in the scripts from unique page features it encounters. For example, in the example above of the 10 page features on a page, the single/consolidated script file may only represent 9 page features worth of scripts because 2 instances were of the same page feature type— this is known on deduplication of bundled resources. With respect to a particular externally referenced dependency (e.g., scripts and styles that are not bundled with the page feature), deduplication by the page rendering engine includes the particular externally referenced dependency into the list of external dependencies only once, even if it is referenced by all page features on a page.

Accordingly, in some embodiments, internal resources are consolidated and deduplicated into a single file that is then compacted and minified. External resources are combined into a single list, ordered by inclusion priority, and referenced in a specific area of the page.

After the dependencies have been optimized, resulting in aggregated optimized dependencies 410, the page rendering engine, at operation 310, creates a rendered page 414 combining the page features 404 and optimized dependencies 410. Optimizations can include minification, compaction, optimizing images etc. In some embodiments, the optimized dependencies 410 are delivered to the end user browser as a separate file.

Due to the rendered page and/or page features and dependencies being delivered together, embodiments avoid blocking of page rendering due to dependencies. Moreover, by delivering an aggregated optimized set of dependencies, embodiments reduce the amount of time required to transmit content for all page features to the end user browser.

By delivering an aggregated optimized set of dependencies, embodiments reduce the amount of time required to transmit and process dependencies required by all page features to the end user browser. Moreover, these dependencies can be placed directly into the base page code using this technique, eliminating the need for the end user browser to request additional resources not available in the original page.

An example implementation may illustrate how some of the aspects of embodiments may be utilized. A user may create two features that require the same font. An editorial staff member places the two features side-by-side on a web page that requires the same body font. One feature is an article sidebar particular to just that page. The other feature is a site-wide boilerplate with information on how to contact the editors via email and social media. The page rendering engine according to some embodiments notices that there are two features on a single page and that both features require the same body font.

The page rendering engine then goes through and counts all the resources that are dependent on all the page features. This action by the page rendering engine eliminates resource duplication, enabling the page rendering engine to serve a necessary component only a single time regardless of how many page features require that component. In some embodiments, rather than counting, the page rendering engine determines each resource that is required at least once. This rendering model means that editorial staff members need only to make changes to backend content and page features in one place, and the changes are available on the page rendering engine platform.

In another example implementation, two page features on a web page may both require jQuery, a lightweight and feature rich library comprising Cascading Style Sheets (CSS), Hypertext Markup Language (HTML), JavaScript, and asynchronous JavaScript and XML (AJAX). For example, an editorial staff member lays out a page with two page features that each also require jQuery. One page feature on the page includes an animated chart, and the other feature includes an interactive element for a story.

In conventional systems, neither instance of the page feature "knows" about the other page feature calling jQuery and as a result jQuery will be served twice when the page is loaded. In contrast, the page rendering engine according to embodiments determines all the resources (dependencies) the particular page required to serve a minimal amount of duplicate resources. Thereby, the page rendering engine serves jQuery once instead of twice, offering improved response times and a more optimized page experience to visitors to the site.

The page rendering engine may create page feature module bundles dynamically that can include multiple JavaScript, CSS, font files, image files, and HTML resources. The page rendering engine may not serve resources separately. Rather, the page rendering engine may compact the resources dynamically, put the resources into a single file, and serve that file.

The embodiments described above improve upon the response times of conventional techniques of page rendering. For example, in conventional techniques, when 10 scripts are included for 10 page features, respectively, the browser would download, load, and process 10 separate files. Furthermore, because it is unclear whether or not a page will contain one or more instances of a particular page feature, in conventional techniques, the same scripts and styles may be included multiple times to ensure they're available at least once. As described above, example embodiment can download a single optimized file, instead of the 10 separate files.

Embodiments facilitate server-side development because, on the sever side, all the individual scripts can be combined into a single file. Moreover, duplicates can be removed in the event a page feature is included multiple times. Moreover, embodiments can then optimize all of the scripts and styles using compaction and minification—techniques available only on the server side.

It will be appreciated that as used herein, the terms system, subsystem, service, logic circuitry, and the like may be implemented as any suitable combination of software, hardware, firmware, and/or the like. It also will be appreciated that the storage device locations herein may be any suitable combination of disk drive devices, memory locations, solid state drives, CD-ROMs, DVDs, tape backups, storage area network (SAN) systems, and/or any other appropriate tangible computer readable storage medium. It also will be appreciated that the techniques described herein may be accomplished by having a processor execute instructions that may be tangibly stored on a computer readable storage medium. For example, instructions for implementing the page rendering engine 202 (and process 300) including the dependency aggregation and rendering with aggregated dependencies 209 and configurations 205 may be performed by executing such instructions by the processor.

While certain embodiments have been described, these embodiments have been presented by way of example only and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions.

What is claimed is:

1. A system comprising:
a network interface; and
a processor configured to:
receive, from an end user device via the network interface, a request for displaying a page on the end user device;
identify a plurality of page feature bundles included in the page, wherein each page feature bundle of the plurality of page feature bundles includes specification for (1) one page feature which is to be displayed on the page, and additionally (2) a manifest configuration object including a user-specified plurality of dependencies on resources for composing the one page feature on the page, wherein the user-specified plurality of dependencies included in the manifest configuration object includes at least one script, and wherein the user-specified plurality of dependencies included in the manifest configuration object are separate from dependencies included in a markup of the page, wherein the plurality of page feature bundles comprises a first page feature bundle and a second page feature bundle, wherein the first page feature bundle comprises a first page feature and a first page feature manifest configuration object and the second first page feature bundle comprises a second page feature and a second page feature manifest configuration object, wherein the first page feature and the second page feature comprise a first widget and a second widget, respectively, that are to be separately displayed on the page, and wherein the first page feature manifest configuration object and the second page feature manifest configuration object comprise a first script specifying one or more dependencies of the first widget and a second script specifying one or more dependencies of the second widget, respectively;
aggregate dependencies, based at least on the respective manifest configuration object of said each page feature bundle including the one or more dependencies of the first widget defined in the first script and the one or more dependencies of the second widget defined in the second script, of said plurality of page feature bundles to generate an optimized set of dependencies for the page, wherein the aggregating dependencies includes copying the at least one script included in the manifest configuration object of each page feature bundle of the plurality of page feature bundles into memory and consolidating the copied scripts to a single file that includes an optimized set of the one or more dependencies of the first widget defined in the first script and the one or more dependencies of the second widget define in the second script;
resolve, using the single file and without separately loading the first script and the second script, dependencies in accordance with the optimized set of dependencies;
render the page by rendering page features of the plurality of page feature bundles using the resolved dependencies; and
provide the rendered page for display to the end user device.

2. The system of claim 1, wherein the providing includes transmitting the rendered page and a file of aggregated said dependencies or resources associated with said dependencies to the end user device.

3. The system of claim 2, wherein page features of said identified page feature bundles include at least two page features requiring a particular resource, and wherein the said file transmitted with the rendered page includes only one instance of the particular resource.

4. The system of claim 1, wherein the aggregating comprises at least one of compacting, minification and de-duplication of said dependencies.

5. The system of claim 4, wherein the aggregating comprises the de-duplication of said dependencies.

6. The system of claim 5, wherein the de-duplication includes both internally packaged scripts and externally referenced dependencies.

7. The system of claim 6, wherein said de-duplication generates a single file for substantially all said dependencies, and wherein the single file is then compacted and minified before use in rendering the web page.

8. The system of claim 1, wherein the page is a web page.

9. The system of claim 1, wherein the aggregating comprises combining a plurality of scripts corresponding to respective page features into a single optimized script.

10. The system of claim 1, wherein the manifest configuration object includes one or more of a template, a script, another manifest, a style, or external file.

11. The system of claim 1, wherein the optimized set of dependencies includes a unified set of normalized, page-specific, dependencies, and wherein the of normalized dependencies include at least one of JavaScript, CSS, images, and rich media.

12. The system of claim 1, wherein said one page feature specifies a content type and one or more attributes associated with rendering content of the content type.

13. The system of claim 1, wherein said one page feature, during rendering of the page feature and before rendering of the web page having the rendered page feature, generates a dependency, and wherein the generated dependency is included in a manifest configuration object before the web page is rendered.

14. A method comprising:
receiving a request for displaying a web page on an end user device;
identifying a plurality of page feature bundles included in the web page, wherein each page feature bundle of the plurality of page feature bundles includes specifications for (1) one page feature which is to be displayed on the web page, and additionally (2) a manifest configuration object including a user-specified plurality of dependencies on resources for composing the one page feature on the page, wherein the user-specified plurality of dependencies included in the manifest configuration object includes at least one script, and wherein the user-specified plurality of dependencies included in the manifest configuration object are separate from dependencies included in a markup of the page, wherein the plurality of page feature bundles comprises a first page feature bundle and a second page feature bundle, wherein the first page feature bundle comprises a first page feature and a first page feature manifest configuration object and the second first page feature bundle comprises a second page feature and a second page feature manifest configuration object, wherein the first page feature and the second page feature comprise a first widget and a second widget, respectively, that are to be separately displayed on the page, and wherein the first page feature manifest configuration object and the second page feature manifest configuration object comprise a first script specifying one or more dependencies of the first widget and a second script specifying one or more dependencies of the second widget, respectively;

aggregating dependencies, based at least on the respective manifest configuration object of said each page feature bundle including the one or more dependencies of the first widget defined in the first script and the one or more dependencies of the second widget defined in the second script, of said plurality of page feature bundles to generate an optimized set of dependencies for the web page, wherein the aggregating dependencies includes copying the at least one script included in the manifest configuration object of each page feature bundle of the plurality of page feature bundles into memory and consolidating the copied scripts to a single file;

resolving, using the single file, dependencies in accordance with the optimized set of dependencies;

rendering the web page by rendering page features of the plurality of page feature bundles using the resolved dependencies; and providing the rendered page for display.

15. The method of claim 14, wherein the providing includes transmitting the rendered page and a file of aggregated said dependencies or resources associated with said dependencies to the end user device.

16. A non-transitory computer readable storage medium having instructions stored thereon, the instructions when executed by a processor of a computer, causes the computer to perform operations comprising:

receiving a request for displaying a web page on an end user device;

identifying a plurality of page feature bundles included in the web page, wherein each page feature bundle of the plurality of page feature bundles includes specification of (1) one page feature which is to be displayed on the web page, and additionally (2) a manifest configuration object including a user-specified plurality of dependencies on resources for composing the one page feature on the page, wherein the user-specified plurality of dependencies included in the manifest configuration object includes at least one script, and wherein the user-specified plurality of dependencies included in the manifest configuration object are separate from dependencies included in a markup of the page, wherein the plurality of page feature bundles comprises a first page feature bundle and a second page feature bundle, wherein the first page feature bundle comprises a first page feature and a first page feature manifest configuration object and the second first page feature bundle comprises a second page feature and a second page feature manifest configuration object, wherein the first page feature and the second page feature comprise a first widget and a second widget, respectively, that are to be separately displayed on the page, and wherein the first page feature manifest configuration object and the second page feature manifest configuration object comprise a first script specifying one or more dependencies of the first widget and a second script specifying one or more dependencies of the second widget, respectively;

aggregating dependencies, based at least on the respective manifest configuration object of said each page feature bundle including the one or more dependencies of the first widget defined in the first script and the one or ore dependencies of the second widget defined in the second script, of said plurality of page feature bundles to generate an optimized set of dependencies for the web page, wherein the aggregating dependencies includes copying the at least one script included in the manifest configuration object of each page feature bundle of the plurality of page feature bundles into memory and consolidating the copied scripts to a single file;

resolving, using the single file, dependencies in accordance with the optimized set of dependencies;

rendering the web page by rendering page features of the plurality of page feature bundles using the resolved dependencies; and providing the rendered page for display.

* * * * *